(12) United States Patent
de Haan

(10) Patent No.: US 8,452,162 B2
(45) Date of Patent: May 28, 2013

(54) ORDER OF TITLES

(75) Inventor: Wiebe de Haan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 814 days.

(21) Appl. No.: 12/403,822

(22) Filed: Mar. 13, 2009

(65) Prior Publication Data

US 2009/0180757 A1    Jul. 16, 2009

Related U.S. Application Data

(63) Continuation of application No. 09/763,442, filed on Feb. 21, 2001, now Pat. No. 7,577,341.

(30) Foreign Application Priority Data

Jun. 25, 1999  (EP) ..................................... 99202056

(51) Int. Cl.
*H04N 5/917*    (2006.01)

(52) U.S. Cl.
USPC ........... 386/329; 386/214; 386/217; 386/283; 386/330

(58) Field of Classification Search
USPC ................. 386/230, 329, 214, 217, 283, 330, 386/248, 332
See application file for complete search history.

(56) References Cited

U.S. PATENT DOCUMENTS

| | | | | |
|---|---|---|---|---|
| 5,784,528 A | * | 7/1998 | Yamane et al. | ............... 386/329 |
| 5,838,362 A | | 11/1998 | Furuya et al. | |
| 5,999,698 A | * | 12/1999 | Nakai et al. | ................... 386/230 |
| 6,118,924 A | * | 9/2000 | Nakatani et al. | ............... 386/248 |
| 6,118,927 A | | 9/2000 | Kikuchi et al. | |
| 6,215,746 B1 | | 4/2001 | Ando et al. | |
| 6,279,524 B1 | | 8/2001 | Schebitz | |
| 6,284,827 B1 | * | 9/2001 | Eckhardt et al. | ............... 524/400 |
| 6,285,827 B1 | | 9/2001 | Nakatani et al. | |
| 6,308,005 B1 | | 10/2001 | Ando et al. | |
| 6,381,398 B1 | | 4/2002 | Yamauchi et al. | |
| 6,393,574 B1 | * | 5/2002 | Kashiwagi et al. | ........... 713/400 |
| 6,449,227 B1 | | 9/2002 | Heo | |
| 6,493,506 B1 | | 12/2002 | Schoner et al. | |
| 7,190,885 B2 | | 3/2007 | Ando et al. | |

FOREIGN PATENT DOCUMENTS

| | | |
|---|---|---|
| EP | 0724264 A2 | 7/1996 |
| EP | 0903738 A2 | 3/1999 |
| EP | 0903744 A2 | 3/1999 |
| EP | 0905699 A2 | 3/1999 |
| EP | 0903744 A3 | 6/1999 |
| EP | 0929072 A2 | 7/1999 |
| EP | 1003337 A2 | 5/2000 |

(Continued)

*Primary Examiner* — Thai Tran
*Assistant Examiner* — Stephen Smith

(57) ABSTRACT

A method of recording an encoded bit stream that represents video objects includes recording a collection of contiguously arranged video objects and management information about recorded video objects. The collection is partitioned into adjacent recordings that represent playable titles, where a playable title is defined as a playback sequence of all complete cells or a subset of complete cells of a recording in the order of allocation within the video object storage area on the disc. The method further includes generating a title list of titles sorted in the order of arrangement within the video object area on the disc. The method further includes defining a free space title that represents free space within the video object area and includes the free space title in the title list.

18 Claims, 8 Drawing Sheets

FOREIGN PATENT DOCUMENTS

| | | |
|---|---|---|
| EP | 1021048 A2 | 7/2000 |
| EP | 1041565 A1 | 10/2000 |
| GB | 2294173 A | 4/1996 |
| JP | 8181971 A | 7/1996 |
| JP | 11155130 A | 6/1999 |
| JP | 11328929 A | 11/1999 |
| JP | 20000232763 A | 8/2000 |
| WO | 9746007 A1 | 12/1997 |
| WO | 9844508 A1 | 10/1998 |
| WO | 00/02195 A2 | 1/2000 |
| WO | 00/30112 A1 | 5/2000 |

* cited by examiner

|  | | VMGI / TT_SRPT / TT_SRPs | | |
|---|---|---|---|---|
|  | EXAMPLE | TT_PB_TY | PTT_Ns | VTS_TTN |
| PLAY LISTS | PLAY LIST 1 | 0000 01x1 |  | 1 |
| | PLAY LIST 2 |  |  | 2 |
| | |  |  | .. |
| | AS ORIGINAL I | 0000 0101 | 4 | I |
| | |  |  | .. |
| | PLAY LIST K | 0000 0101 | 3 | K |
| | |  |  | .. |
| | FREE SPACE | 0000 0111 | 1 | M |
| | |  |  | .. |
| | PLAY LIST N | 0001 01x1 |  | N ( < 50 ) |
| ORIGINALS | ORIGINAL 1 | 0000 01x1 |  | N + 1 |
| | ORIGINAL 2 |  |  | N + 2 |
| | |  |  | .. |
| | ORIGINAL I | 0000 0101 | 4 | N + I |
| | |  |  | .. |
| | ORIGINAL K | 0000 0101 | 5 | N + K |
| | |  |  | .. |
| | FREE SPACE | 0000 0111 | 1 | N + M |
| | |  |  | .. |
| | ORIGINAL N | 0000 01x1 |  | N + N |

AGL_Ns           == '1'
TT_PTL_ID_FLD    == zero
VTSN             == '1'

Bit 1 of TT_PB_TY indicates free space

| VTSI/VTS_PTT_SRPT/TTUs | |
|---|---|
| PGCN | PGN |
| 1 | 1 |
|  | .. |
| 2 | 1 |
| .. | .. |
| I | 1 |
|  | 2 |
|  | 3 |
|  | 4 |
| K | 1 |
|  | 2 |
|  | 3 |
| M | 1 |
| N | 1 |
| N | .. |
| N+1 | 1 |
|  | .. |
| N+2 | 1 |
| .. | .. |
| N+I | 1 |
|  | 2 |
|  | 3 |
|  | 4 |
| N+K | 1 |
|  | 2 |
|  | 3 |
|  | 4 |
| N+M | 1 |
| N+N | 1 |
|  | .. |

FIG. 6B

| VTSI/VTS_PGCIT/VTS_PGC I_SRPs | |
|---|---|
| VTS_TTN | VTS_PGCI_SA |
| 1 | |
| 2 | |
| .. | |
| I | → ORIGINAL I PGCI |
| .. | |
| K | → PLAYLIST K PGCI |
| .. | |
| M | → FREE SPACE M PGCI |
| .. | |
| N | |
| N + 1 | → ORIGINAL 1 PGCI |
| N + 2 | → ORIGINAL 2 PGCI |
| .. | |
| N + I | → ORIGINAL I PGCI |
| .. | |
| N + K | → ORIGINAL K PGCI |
| .. | |
| N + M | → FREE SPACE M PGCI |
| .. | |
| N + N | → ORIGINAL N PGCI |

Entry type    == 1
Block mode    == 00b
Block type    == 00b
PTL_ID_FLD    == 0000h Equal VTS_PGCI_SA indicate "no THL"

FIG. 6C

ORDER OF TITLES

This application is a continuation of application Ser. No. 09/763,442 now U.S. Pat. No. 7,577,341 and is incorporated by reference herein.

FIELD OF THE INVENTION

The invention relates to a method for recording encoded information signals on a disc like record carrier, such as an optically readable disc. The invention further relates to a recording apparatus for performing the method.

BACKGROUND OF THE INVENTION

The DVD-Video format for optically readable discs is defined in the DVD Specifications for Read-Only Disc, part 3: Video Specifications (version 1.0, August 1996). Relevant parts therefrom are being disclosed in for instance European Patent Application EP 724 264 and U.S. Pat. No. 5,784,528, respectively document D1 and D2 in the list of referred documents that can be found at the end of this description. Both documents are incorporated by reference herein.

The DVD-Video format as defined in the above mentioned Specifications for READ-Only Disc and disclosed in D1 and D2 was created for storing movies and other video content on read-only DVD media. Some of the features of the DVD-Video format make it less suitable for real-time recording applications.

However, it is desirable to create and record video streams and associated data structures on rewritable media in real time which are should preferably be almost identical to the structures defined in the DVD-Video format. Such rewritable discs should be play back compatible with the majority of the installed base of consumer DVD-Video players. The method according to the invention describes a novel and inventive format for DVD-Video compatible real-time recording of video streams, referred to hereinafter to as Real Time DVD Video Recording or shortly DVD-Video Recording. The format defined is intended for home video recording on an optical medium which is playback compatible with DVD-Video players.

The above-mentioned DVD-Video format demands that data for a VTS be allocated contiguously. This gives all kinds of problems when part of the data is overwritten with new recordings:

The DVD-Video format allows an arbitrary numbering of Video Titles (VT) within a Video Title Set (VTS). For instance such as the sequence of Video Titles: VT1, VT3, VT2, . . . . Overwriting for instance Video Title VT 3 with a new and larger Video Title VT4, will result in overwriting also Video Title VT2. This would appear strange to a user, employing a Video Title menu listing the Video Titles in consecutive order: VT1, VT2, VT3, . . . . Such a sequence would be changed into a sequence like: VT1, X, VT4, . . . with X denoting a deleted Video Title.

Thus, when partial overwrite is one of the features, the user model of the recording medium becomes complicated.

OBJECT AND SUMMARY OF THE INVENTION

In consequence, amongst other things, it is an object of the invention to obviate the above-mentioned disadvantages.

By defining the playable items and the list of playable titles in the order of allocation, the recording medium appears to a user as a sequential, tape like medium. The user will understand that when overwriting a specific recording, a subsequent recording may be overwritten too. He would not understand this if the recordings were randomly ordered, as allowed in the DVD Video format, possibly leading to disappearing of a previous recording when overwriting a specific recording.

This allows a playback device to employ a simple user model in case of real time DVD video recordings. A title menu, used by a player for display and selection, can simply be read from the management area. There is no need to read the information in the video storage area itself and consequently calculating a title menu. This means that a player adapted for playback of pre-recorded DVD Read-Only discs, does not require modification in order to display a proper title menu.

BRIEF DESCRIPTION OF THE DRAWINGS

These and further aspects and advantages of the invention will be apparent from and elucidated in more detail hereinafter with reference to the disclosure of preferred embodiments, in particular with reference to the appended figures in which.

FIG. 7 shows a recording apparatus according to a first embodiment of the invention, the respective units therefrom being illustrated in more detail in the following figures of which

DESCRIPTION OF THE EMBODIMENTS

The data structure to be disclosed hereafter explains the DVD-Video compatibility behind the Real-Time Video Recording Format and specifies how it should be used by recorders to create DVD-Video playback compatible discs.

To overcome limitations for real-time recording of the DVD-Video format for read-only discs, a number of changes have been made to the data organization and the use of some of the recording parameters in the real-time data stream.

The use of Titles and Menus is restricted to improve exchangeability of rewritable discs between recorders. In addition to this, strict rules are defined for Play Lists, which can be created by the user to define playback sequences of pieces from the recorded Titles.

First a list of definitions is given.

Access Unit

Coded representation of a presentation unit. See ISO/IEC 13818-1 related to MPEG-2 systems, document D3 in the list of referred documents that can be found at the end of this description, for a more detailed definition of MPEG audio and video access units.

Figure 1:
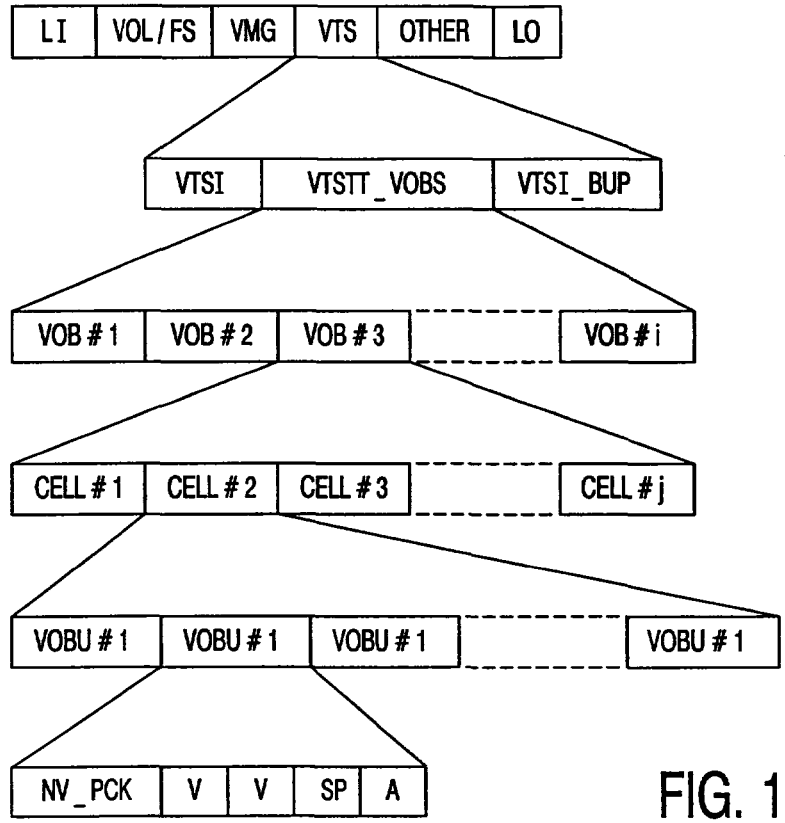
FIG. 1 illustrates the logical data structure of a DVD disc corresponding to an embodiment for DVD Video Recording according to the invention.

Buffer Cell
  Last Cell of a Video Object (VOB) containing just one Video Object Unit (VOBU). The Buffer Cell is not used by any Program Chain (PCGC). The Cell ID of a Buffer Cell is equal to 255.
Cell
  Sequence of one or more Video Object Units (VOBU). The first VOBU of a Cell shall contain video data. Cells are the basic presentation units for the Program Chains (PGC)
Chapter
  Subdivision of a Title. Other word for Part_of_Title (PTT).
DVD-VR Format
  Short for Video Format Specifications for Real-Time DVD-Video Recording.
DVD-Video Format for Read-only Discs
  Format as specified in the DVD specifications for Read-Only Disc-Part 3: Video Specifications (version 1.0, August 1996), elements of which are being disclosed in D1 and D2.
DVD-Video Format for Rewritable Discs
  Format of DVD-Video related structures with the modifications specified in this disclosure.
Elementary Stream
  An elementary stream is a generic term for a sequence of coded video, coded audio, coded graphics or other access units that can be correctly decoded by a hypothetical decoder operating without special control from an external controller.
Free Space
  Recording which is represented by a Free Space Title in the Title Search Pointer Table. If the last Recording is free space, it is not represented in this table.
Free Space Title
  Full Title or Play List Title which cannot be played back as the related Program Chain Information contains a pre-command to prevent this. Time_Play( ), Time_Search( ), PTT_Play( ) and PTT_Search( ) for a Free Space Title are blocked. The Cell information in the Program Chain of a Free Space Title may not be reliable.
Full Title
  Title representing one Recording.
  When a Full Title is played, all complete Cells (except the Buffer Cells) contained in the Recording are played in the order of data allocation in the VTS Title VOBS. Full Titles may be accessible via the Title Menu.
Group of Pictures (GOP)
  Series of coded pictures starting with a GOP-header followed by an intra coded picture. The GOP represents up to 36 display fields at a rate of 59.94 Hz, or 30 fields at a rate of 50 Hz.
MPEG-2 Program Stream (MPEG-2 PS)
  Program Stream as defined in ISO/IEC 13818-1 related to MPEG-2 systems, document D3 in the list of referred documents that can be found at the end of this description.
Multiplexed Stream
  A multiplexed stream is a single bit-stream, combining one or several elementary streams that can be played in synchronism.
Play List (or Play List Title)
  Title representing a play back sequence of Cells from one Recording. Play Lists are accessible via the Title Menu.
Program Chain (PGC)
  Playback sequence of Cells for the presentation of a Menu or a Title.
Real Title
  Full Title or Play List Title which is not a Free Space Title.
Recording
  Contiguous piece of the VTS Title VOBS, enclosing an integer number of MPEG-2 PS packs.
  The VTS Title VOBS is partitioned into adjacent Recordings which do not necessarily coincide with the VOBs in the VOBS.
Title
  User accessible unit listed in the Title Search Pointer Table.
Title Menu
  This is a menu that gives the user access to Play Lists and optionally to Full Titles.
Title Search Pointer Table
  Table in the Video Manager listing all available Play Lists and Full Titles on the disc. It is a starting point for finding the data that is relevant for playing back a Title.
Video Manager (VMG)
  DVD-Video data structures containing information about the recorded video data and the Title Menu. The Title Search Pointer Table is one of the elements of the Video Manager.
Video Object (VOB)
  A Video Object is (a part of) a sequence of contiguously recorded Cells, together constituting (a part of) an MPEG-2 Program Stream.
  An integer number of MPEG-2 Program Stream packs may be missing from the beginning of the first Cell of the VOB, if this Cell is not used by any Title. The last Cell of a VOB is a Buffer Cell.
  A VOB shall contain one video elementary stream. Gaps in the video stream are allowed under conditions specified by the DVD-Video specifications.
  According to the DVD-Video specifications a VOB may also contain up to eight Audio streams (in elementary audio streams and/or in private streams) and up to 32 Sub-picture streams. The DVD-VR format only allows one Audio stream and one Sub-picture stream within the same VOB.
Video Object Unit (VOBU)
  Integer number of MPEG-2 Program Stream packs representing a presentation period between 0.4 and 1.0 seconds.
  The last VOBU of a Cell has a maximum presentation period of 1.2 seconds. When the VOBU contains Video, the video data consists of an integer number of GOPs and starts with a sequence header, a GOP header and an intra coded picture.
  A Sub-picture Unit is optional in a VOBU and cannot cross VOBU boundaries. The SPU's associated validity period ends at or before the end presentation time of the VOBU.
Video Object Set (VOBS)
  This is a collection of contiguously recorded VOBs.
  VOBs which are used for the menus are stored in the Video Manager VOBS (VMGM_VOBS). VOBs which are used for the Titles are stored in the VTS Title VOBS (VTSTT_VOBS).
  FIG. 1 shows the general data structure in accordance with the Real-Time Video Recording format. The data structure comprises a Lead-In area (LI), a Volume (VOL) and File System area (FS), a Video Manager area (VMG), one Video Title Set (VTS), an area reserved for other structures (OTHER) and a Lead-Out area (LO) as known from the DVD-ROM data structure. Not specifically shown in FIG. 1 is Presentation Control Information (PCI) and Data Search Information (DSI) within the Video Object Set for VTS Titles (VTSTT_VOBS), both dispersed in the Navigation Packs (NV_PCK) of each Video Object Unit (VOBU).
  The data organization according to the Real-Time Video Recording format will first be discussed in general.
  With respect to the Video Manager (VMG) the following is remarked. The Video Manager (VMG) shall contain a Title Menu. Consequently a Video Object Set for Video Manager Menu (VMGM_VOBS) is mandatory.
  With respect to the Video Title Sets (VTS) the following is remarked. The data structure on a disc contains only one Video Title Set (VTS). The Root Menu shall contain a dummy Program Chain (PGC) with a pre-command calling the Title Menu. No other Video Title Set (VTS) menus shall be present on the disc. Consequently the Video Title Set (VTS) does not contain a Video Object Set for a Video Title Set Menu (VTSM_VOBS). The Video Object Set for Video Title Set Titles (VTSTT_VOBS) of the Video Title Set (VTS) contains the recorded video content.

With respect to the Video Object Set (VOBS), the Video Objects (VOBs) and Cells, the following is remarked. A Video Object (VOB) is (a part of) a sequence of contiguously recorded Cells, together constituting (a part of) an MPEG-2 Program Stream as defined in D4. An integer number of MPEG-2 Program Stream packs may be missing from the beginning of the first Cell of the Video Object (VOB), if this Cell is not used by any Title. The last Cell of a Video Object (VOB) is a Buffer Cell, which is not used by any Title. EA Video Object Set (VOBS) is a collection of contiguously recorded Video Objects (VOBs). Video Objects (VOBs) and Cells on a rewritable disc are not fully compliant with the Video Specifications for the DVD Read-Only Disc as disclosed in D2 and D4. The following exceptions are allowed or required:
  1) The DVD-Video specification demands that a Video Object (VOB) starts with an System Clock Reference (SCR) equal to zero. This is not required for DVD-VR discs.
  2) The Display of the video stream from one Video Object (VOB) does not have to start with a top field nor have to end with a bottom field.
  3) The DVD-Video specification prescribes incremental numbering of Video Objects (VOBS) and Cells. When recording the disc for the first time that requirement can generally be met. However, when old recordings are (partly) overwritten, or when the user does editing, it may not be possible to maintain the incremental numbering. To overcome this problem, DVD-VR format requires that the Video Object Identification number (VOB ID) of all Video Object (VOBs) is equal to '1'. In addition to this, Cell ID numbers (except number 255) remain unique but they are allowed to be non sequential.
  4) Video Objects (VOBs) and Cells contain Navigation packs (NV_PCK) with forward references to facilitate forward search. Some of these forward references cannot be known at recording time and therefore must be encoded with values that make legacy playback devices behave in an acceptable way.
  5) The Navigation packs (NV_PCK) also contain a parameter specifying the presentation termination time of the last video frame of the Video Object (VOB). This parameter cannot be made correct in real time in all cases. To solve this problem a high number will be recorded for this parameter. A Buffer Cell at the end of a Video Object (VOB) guarantees that the end of a Video Object (VOB) is never reached during play back.

With respect to recordings, the following is remarked:

The Video Object Set for Titles in a Video Title Set (VTSTT_VOBS) can be partitioned into a collection of adjacent pieces, called Recordings, which do not necessarily coincide with the Video Objects (VOBs). Recordings enclose an integer number of MPEG-2 PS packs.

Recordings relate to the partitioning of the content as it is presented to the user.

With respect to Full Titles, Play Lists and Free Space, the following is remarked:

For each Recording two One_Sequential_PGC_Titles are created: one Full Title and one Play List. The Full Title defines play back of all complete Cells (except Buffer Cells) of a Recording in the order of allocation in the Video Object Set (VOBS). The Play List may be different from the Full Title. If so it defines play back of a subset of the Cells which are played by the Full Title.

Full Titles and Play Lists are each represented as a Title in the Title Search Pointer Table in VMGI (TT_SRPT) and as a Title Unit (TTU) in the Part_of_Title Search Pointer Table in the VTSI (VTS_PTT_SRPT). A Play List points to the same Program Chain (PGC) as the corresponding Full Title, unless a different Program Chain (PGC) is recorded for the Play List.

Figure 6A:
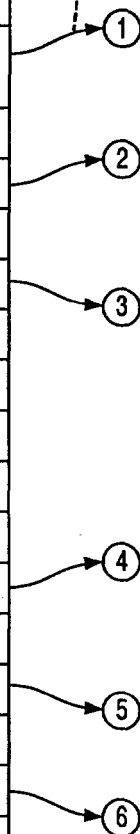
FIG. 6 shows an example of finding a Titles Program Chain Information (PGCI)
Figure 6B:
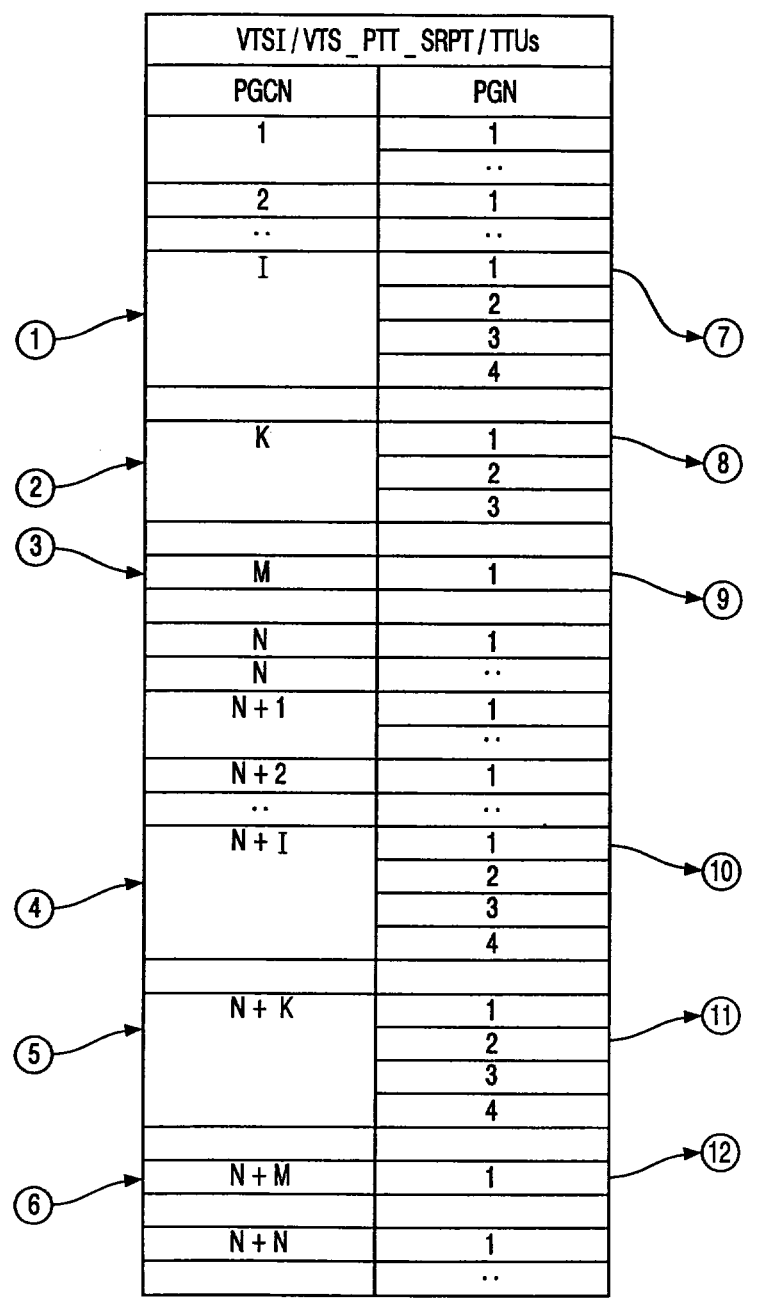

Full Titles and Play List Titles are Real Titles, unless they are tagged as Free Space. When a Full Title is deleted by the user, both the Full Title and the Play List in the Title Search Pointer Table (TT_SRPT) are tagged as Free Space by setting a unique Playback Type value (TT_PB_TY). If two consecutive Full Titles are deleted, the entries in the Title Search Pointer Table (TT_SRPT) shall be combined into one new Title. Also the related Play Lists are combined and tagged as Free Space. Free space that is available on the disc at the end of the VTS Title VOBS or beyond the boundaries of the VTS, is not reflected in the TT_SRPT. FIG. 6 illustrates an example of finding a Title's PGCI.

Within FIG. 6 the following data structures are given: Title Play Back Type (TT_PB-TY), Number of Part_of_Title (PTT_Ns), VTS Title Number (VTS_TTN), PGC_Number (PGCN), Program Number (PGN), Start Address of VTS Program Chain Information Table (VTS_PGCI-SA), Program Chain Information Table (PGCIT), Number of Angles (AGL-Ns), Parent_ID_field for Title (TT_PTL_ID-FLD), VTS Number (VTSN) and Parent ID-field (PTL_ID_FLD).

Each Title (except for the last Play List Title and the last Full Title) is linked to the next Title by a Link PGCN instruction in the associated Program Chain Information (PGCI). The Program Chain Information (PGCI) of the last Play List and the last Full Title contains a CallSS to the Title Menu. If the Title is tagged as Free Space, this instruction is stored as a pre-command in the Program Chain Information (PGCI). Otherwise the instruction is stored as a post-command.

The number of Full Titles on a DVD-VR disc is equal to the number of Play Lists with a maximum of 49 Titles can be sub-divided into a maximum of 99 Chapters (Part_of_Titles). The maximum number of Chapters for all Full Titles on one disc is 254.

In the following the restrictions and modifications compared to the read-only format will be given.

Figure 2:
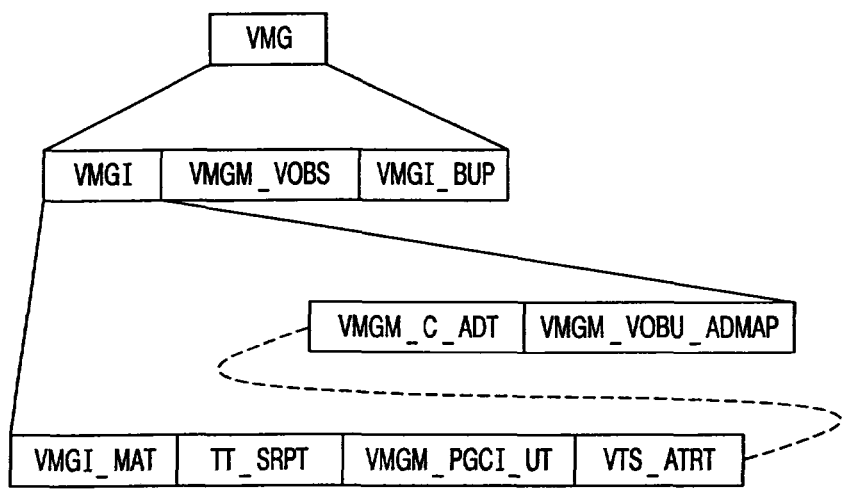
FIG. 2 illustrates more in detail the structure of the Video Manager area (VMG) of FIG. 1.

As already disclosed with reference to FIG. 1, exactly one Video Title Set is recorded on disc. FIG. 2 illustrates the data structure of Video Manager General Information (VMGI) within the Video Manager (VMG) area as shown in FIG. 1. As in FIG. 1, the Presentation Control Information (PCI) and Data Search Information (DSI) are not shown in FIG. 2, although this information is dispersed in corresponding Navigation Packs (NV_PCK) in each Video Object Unit (VOBU) of the Video Object Set for the Video Manager Menu (VMGM_VOBS).

With respect to the Video Manager Information Management Table (VMGI_MAT), the first 8 bytes of the Provider Unique ID (PVR_ID) contains the string 'DVD-VR01'. The First Play Program Chain (FP_PGC) contains just a JumpSS to the Title Menu as a pre-command.

The Title Search Pointer Table (TT_SRPT) consists of two sections of equal length. The first half contains pointers for N Play Lists and the second half contains pointers to N Full Titles. Play Lists as well as Full Titles are sorted in the order of incrementing start addresses of the first used Cell in the Video Object Set (VOBS). All Titles are One_Sequential_PGC_Titles for which Time_Play( ) and Time_Search( ) are blocked. Part_of_Title_Play( ) and Part_of_Title_Search( ) shall be blocked for Titles which are associated with Free Space and shall not be blocked for other Titles. Table 1 lists allowed Playback Types as indicated by the Title_Playback_Type (TT_PB_TY) field.

TABLE 1

| Allowed values of TT_PB_TY | |
| --- | --- |
| Value of TT_PB_TY | Type of Title |
| 0000 0101b | Real Title which is not the last Play List or not the last Full Title |
| 0001 0101b | Real Title which is the last Play List or the last Full Title |
| 0000 0111b | Free Space Title |

The Video Manager Menu Program Chain Information Unit Table (VMGM_PGCI_UT) is just linked to the Title Menu. There shall be only one Language Unit. The Video Manager Menu exists in this Language Unit.

Following the Video Title Set Attribute Table (VTS_ATRT), the Video Manager Menu Cell Address Table (VMGM_C_ADT) is restricted to a maximum of 170 cells and the Video Manager Menu Video Object Unit Address Map (VMGM_VOBU_ADMAP) to a maximum of 511 VOBUs. The remaining part of the Video Manager area (VMG) is occupied with the Video Manager Menu Video Object Set (VMGM_VOBS) and the back up of the Video Manager Information (VMGI_BUP).

Figure 3:
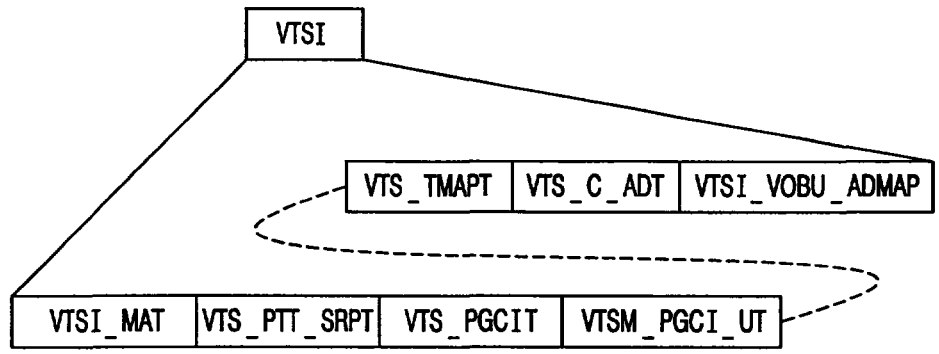
FIG. 3 illustrates more in detail the structure of the Video Title Set Information area (VTSI) of FIG. 1.
Figure 4:
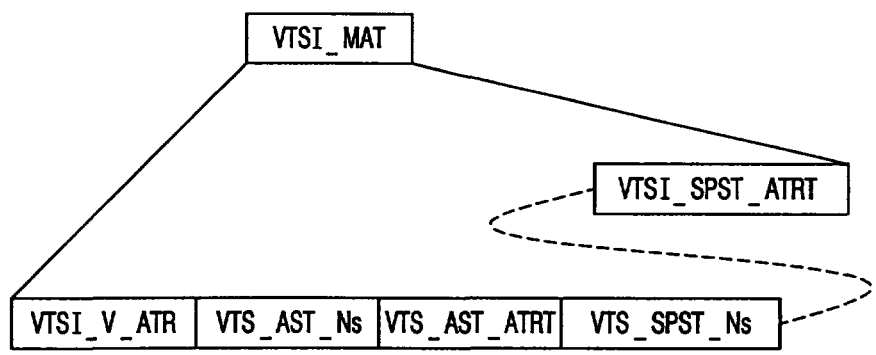
FIG. 4 illustrates the structure of the Video Manager Information Management Table (VTSI_MAT) of FIG. 2.

With reference to FIG. 3, the Video Title Set Information (VTSI) will be discussed. As the Root Menu contains just a dummy Program Chain (PGC) and other menus are not allowed, the Video Title Set (VTS) Menus have no associated Video Object (VOB) data. Consequently the Cell Address Table of the Video Title Set Menu (VTSM_C_ADT) and the Address Map of the Video Object Unit of the Video Title Set (VTSM_VOBU_ADMAP) do not exist.

The Management Table of the Video Title Set Information (VTSI_MAT) comprises the following area (not shown in the figure):
 the VTS Video Attributes (VTS_V_ATR) (the video compression mode complies with MPEG-2),
 the number of Audio Streams (VTS_AST_Ns) describing the number of different audio stream attribute sets used in this VTS,
 the VTS Audio Stream Attribute Table (VTS_AST_ATRT) listing the different audio stream attribute sets which are defined (and may or may not be used) for this VTS: The PGCI for each Title defines which of the sets is actually used,
 the number of Sub-picture Streams (VTS_SPST_Ns) (set to one in this VTS) and
 the VTS Sub-picture Stream Attribute Table (VTS_SPST_ATRT) (all fields in this table are zero)

The Video Title Set Information (VTSI) further comprises further a Video Title Set Part_of_Title Search Pointer Table (VTS_PTT_SRPT) wherein the Title Units are recorded in the same order as Titles in Title Search Pointer (TT_SRPT).

Next is present a Video Title Set Program Chain Information Table (VTS_PGCIT). The number of Video Title Set Program Chain Information (VTS_PGCI) search pointers is equal to the number of Titles in Title Search Pointer Table (TT_SRPT). The search pointers are recorded in the same order as the Titles. All Program Chains (PGCs) are Entry PGCs with all bits zero for Block mode, Block type and Parental ID Field (PTL_ID_FLD). When a Play List is equal to the associated Full Title, their Start Address of Video Title Set Program Chain Information (VTS_PGCI_SA) values are identical.

With respect to the Video Title Set Menu Program Chain Information Unit Table (VTSM_PGCI_UT) the following is remarked. The number of Video Title Set Menu Language Units as specified in VTSM_PGCI_UTI shall be 1. There is exactly one Video Title Set Menu Language Unit Search Pointer (VTSM_LU_SRP). The Video Title Set Menu Existence field (VTSM_EXST) shall contain the value (1000 0000b) to indicate that just the Root Menu exists. The Video Title Set Menu Language Unit (VTSM_LU) contains just one Program Chain Information Search Pointer (VTSM_PGCI_SRP). The Video Title Set Menu Program Chain Category parameter (VTSM_PGC_CAT) for the Video Title Set Menu Program Chain (VTSM_PGC) contains the value (8300 0000h) indicating that the associated Program Chain (PGC) is the Entry PGC for the Root Menu. There is exactly one Video Title Set Menu Program Chain Information (VTSM_PGCI).

The Video Title Set Time Map Table (VTS_TMAPT) contains Video Title Set Time Maps (VTS_TMAPs) that are present for all Titles on the disc but do not contain any map entries.

With respect the Video Title Set Cell Address Table (VTS_C_ADT), the parameter containing the number of Video Object in the Video Title Set (VTS_VOB_Ns) contains the contains the value '1'. It is noted that the VTS_VOB_Ns does not reflect the actual number of VOBs in the Video Object Set of a rewritable disc. It is set to 1 as the VOB_ID number of all VOBs is set to '1'. All Video Title Set Cell Piece Information (VTS_CPI) have the same value ('1') for the Video Title Set Video Object ID Number (VTS_VOB_IDN). Exactly 254 VTS_CPI blocks are recorded with VTS_C_IDN starting from '1' and incrementing up to and including '254'. The Start Address and End Address of the Video Title Set Cell Piece (VTS_CP_SA and VTS_CP_EA) of Cell Pieces which are not referenced by any PGC of a Real Title contain the value (0000 0000h). It is noted that Cell Pieces that are referenced by a PGC of a Free Space Title contain zero start and end addresses.

With respect to The Video Title Set Video Object Unit Address Map (VTS_VOBU_ADMAP) it is remarked that all Video Object Unit (VOBU) start addresses of the VOBUs which are completely contained in VTSTT_VOBS are listed here in ascending order. It is noted that VOBU start addresses of VOBUs which are part of Free Space are also included in the VTS VOBU Address Map.

Figure 5:
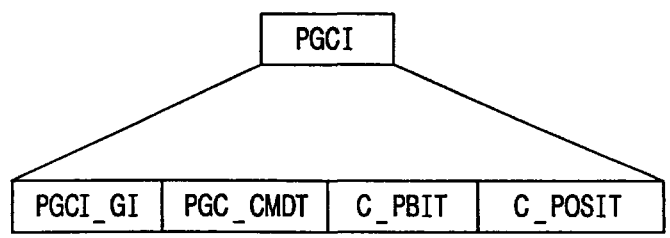
FIG. 5 illustrates the structure of the Program Chain Information area (PGCI)

Next the structure of the Program Chain Information area (PGCI) for Title Program Chains will be given with reference to FIG. 5. This structure comprises a Program Chain General Information Area (PGC-GI), a Program Chain Command Table (PGC_CMDT), a Cell Playback Information Table (C_PBIT) and a Cell Position Information Table (C_POSIT).

With respect to the Program Chain General Information (PGC-GI) it is noted that exactly one of the Availability flags in the Program Chain Audio Stream Control Table (PGC_AST_CTLT) is set to (1b). When the $i^{th}$ Availability flag is set, the $i^{th}$ Audio stream parameter set defined for this Video Title Set (VTS) is valid for this Program Chain (PGC). The Decoding Audio stream number is always '0'.

The availability flag of the first Program Chain Sub-picture Stream Control (PGC_SPST_CTL) field in the Program Sub-picture Stream Control Table (PGC_SPST_CTLT) is set to (1b). All other bits of the Program Sub-picture Stream Control Table (PGC_SPST_CTLT) contain the value (0b).

The Program (PG) Playback mode in the Program Chain Navigation Control (PGC_NV_CTL) is set to sequential playback. The Still time value is set to no Still.

The PGC Command Table (PGC-CMDT) contains exactly three commands. According to this version of the specification only one command is actually used (for Title linking), the other two commands are NOP commands (0000 0000h). Which command is used for Title linking is defined in Table 2.

TABLE 2

| Commands in PGCI | | |
|---|---|---|
| PGC associated with . . . | contains . . . | as a . . . |
| Real Title which is not the last Play List or not the last Full Title in TT_SRPT | LinkPGCN to PGC of next Real Title | post-command |
| Real Title which is the last Play List or the last Full Title in TT_SRPT | CallSS to Title Menu | post-command |
| Free Space Title | LinkPGCN to PGC of next Real Title | pre-command |

With respect to Cell Playback Information Table (C_PBIT): Cells are not part of an Angle Block and do not exist in an Interleaved Block.

With respect to the Cell Position Information Table (C_POSIT): the Identification Numbers of the Video Objects of all Cells in the PGC contain the value '1'. It is noted that, on DVD-VR discs, all VOBs have the same VOB_IDN.

It is allowed that the Cell ID number of a Cell of which the Seamless playback flag set in Cell Playback Information, is not the same as the previous Cell ID number incremented by 1.

With respect to the Presentation Control Information (PCI) it is noted that modifying a Play List may require that a Cell is split into two new Cells. In that case all values of Cell Elapse Time (C_ELTM in PCI_GI) shall be updated in all PCI fields in the second Cell.

Additional data fields with respect to the DVD-Video format for Read-Only discs for carrying real-time stream attributes are given below.

The last reserved 32 bytes of the General Information of Presentation Control Information (PCI_GI) are redefined in this specification as shown in table 3

TABLE 3

| Redefinition of reserved fields at end of PCI_GI | | |
|---|---|---|
| | Contents | Number of bytes |
| Reserved | Reserved | 16 bytes |
| (8) PCI_GI_XI | PCI_GI Extension Information | 1 byte |
| (9) RT_V_ATR | Video Attributes | 1 byte |
| (10) RT_AST_ATR | Audio Stream Attributes | 1 byte |
| Reserved | Reserved | 13 bytes |
| | Total | 32 bytes |

PCI_GI_XI identifies the application and specifies the length of the extension. If all bits in this byte are zero, also the bytes of PCI_GI following this field are zero:

| b7 | b6 | b5 | b4 | b3 | b2 | b1 | b0 |
|---|---|---|---|---|---|---|---|
| Application Identifier | | | | Extension Length | | | |

Application Identifier contains the value (0001b) if the stream attributes as defined in VTSI_MAT for this VTS must be overruled by the real-time stream attributes. Otherwise contains the value (0000b). The real-time stream attributes are valid from Start PTM until End PTM of the VOBU in which this field is contained.

Extension Length defines the number of bytes for this extension following this field. It shall contain the value (0010b) if Application Identifier is (0001b). It contains the value (0000b) if Application Identifier is (0000b).

RT_V_ATR describes the real-time Video stream attributes.

| b7 | b6 | b5 | b4 | b3 | b2 | b1 | b0 |
|---|---|---|---|---|---|---|---|
| Aspect ratio | | Reserved | | reserved | Source picture letter boxed | reserved | Film camera mode |

Aspect ratio, Source picture letterboxed and Film camera mode have meanings as defined in the DVD specifications for the Read_Only Disc.

RS_AST_ATR describes the real-time Audio stream attributes:

| b7 | b6 | b5 | b4 | b3 | b2 | b1 | b0 |
|---|---|---|---|---|---|---|---|
| reserved | | | | | Surround Type | | reserved |

Surround Type as defined in the DVD Specifications of the Read-Only Disc. With respect to Data Search Information (DSI) it is noted that all VOBs are allocated in Contiguous Blocks and there are no Angles.

With respect to the Data Search Information General Information (DSI_GI) it is remarked that the Video Object ID number (VOB ID) number is always 1. Further there is no requirement that the Cell ID numbers are monotonically increasing from 1 in the Video Object. The following rules shall be applied for Cell ID:
  Cell ID is identical in all VOBUs belonging to the same Cell
  Cells which are used by Real Titles are uniquely identified by their Cell ID It is noted that modifying a Play List may require that a Cell is split into two new Cells. In that case all values of Cell Elapse Time (C_ELTM in DSI_GI) shall be updated in all DSI fields in the second Cell.

With respect to Video Object, it is remarked that an integer number of MPEG-2 Program Stream packs may be missing from the beginning of the first Cell of the VOB, if this Cell is not used by any Title. The last Cell of a VOB is a Buffer Cell.

It is noted that seamless connections between VOBs are excluded.

Only one Audio stream is allowed within a VOB. The Audio decoding stream number is '0'.

Only one Sub-picture stream is allowed within a VOB. The Sub-picture decoding stream number is '0'. Data for a Sub-picture Unit (SPU) is fully contained in one VOBU. The SPU validity period shall not start before the Start PTM of the VOBU, nor shall it end later than the End PTM of the VOBU.

The DVD-Video format for rewritable discs is not fully identical to the DVD-Video format for read-only discs. The differences are (1) in the rules for data allocation and (2) in some details of the navigation data in the real-time data streams. The first kind of differences generally has no consequences for DVD-Video players. As a consequence of the second kind of differences in some cases trick mode behavior of DVD-Video playback devices with rewritable discs may not be always exactly the same as with prerecorded discs. Manufacturers can improve compatibility between DVD-Video players and rewritable discs by following the guidelines given in the next.

With respect to VOBS Structures; on rewritable DVD-Video discs some rules for the Video Object Set data structures are different from the rules for read-only discs.
DVD-Video players will play back rewritable discs well when they are robust against:

non-sequential numbering of VOBs in the VTSTT_VOBS non-sequential numbering of Cells within a VOB the existence of remnants of partly overwritten Cells or other unused data in between "active" Cells modified rules for forward search pointers as defined next:

DVD-Video recorders are required to at least fill in correct forward pointers FWDI(n) for $n \leq M$. Forward pointers FWDI(n) with $M < n \leq N$ contain the last correct value. For $n > N$ forward pointers point to the end of the current Cell. The duration of a Cell on a rewritable disc is typically 60 seconds.

This means that for forward search functionality DVD-Video players can still rely on the FWDI pointers for the lower speeds (2x, 4x, 8x). For higher speeds, the player can still use the long distance FWDI pointers but in this case they point to the end of the current Cell. If accurate fast search speeds are desired, the speed can be adjusted by picking up intermediate pictures (e.g. by applying a FWDI(6) pointer) or by adapting the display period of the pictures.

Figure 7:
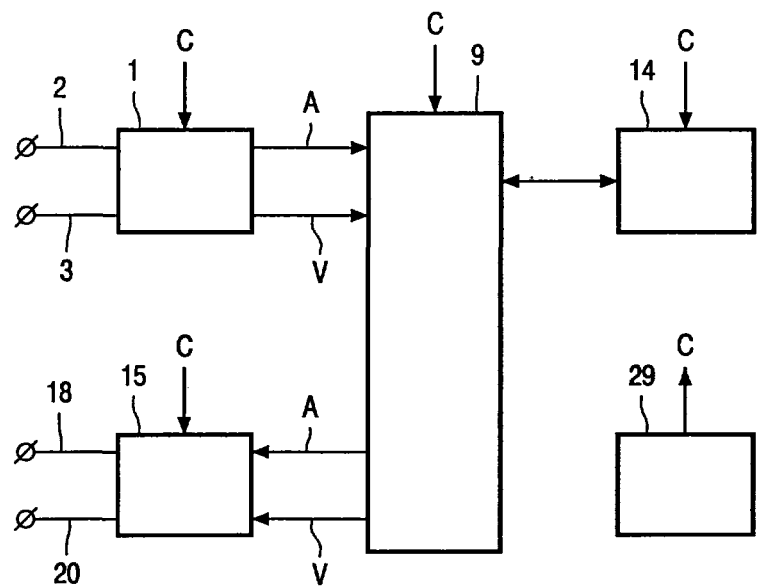

FIG. 7 shows a recording apparatus according to a first embodiment of the invention. The recording apparatus is composed of several units. One unit is the A/V input unit 1. The A/V input unit 1 receives image and sound signals at antenna input terminal 2 and an external sound/image input terminal 3. The antenna input terminal 2 is adapted to receive broadcasted modulated A/V signals transmitted by either satellite, terrestrial or cable source. The external sound/image input terminal 3 is adapted to receive a non modulated audio signal or a non-modulated video signals generated directly by respectively an audio or a video source.

Figure 8:
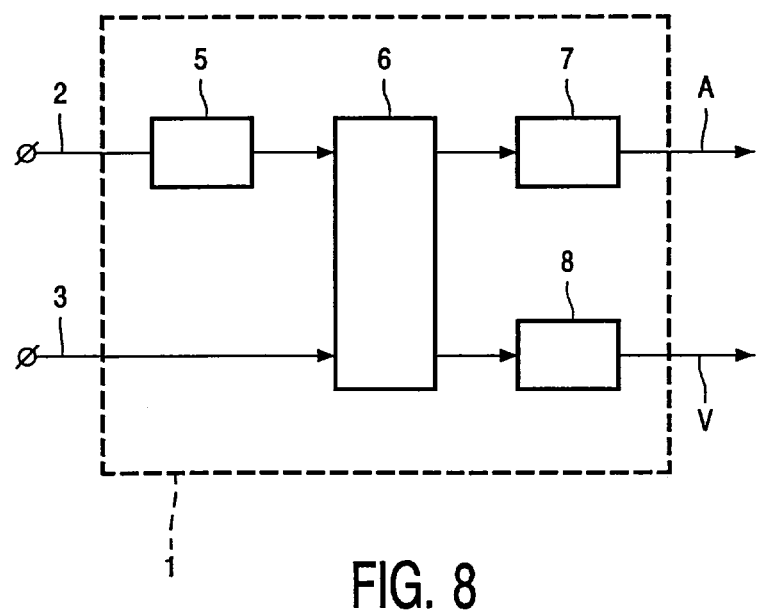
FIG. 8 shows an A/V input unit.
Figure 9:
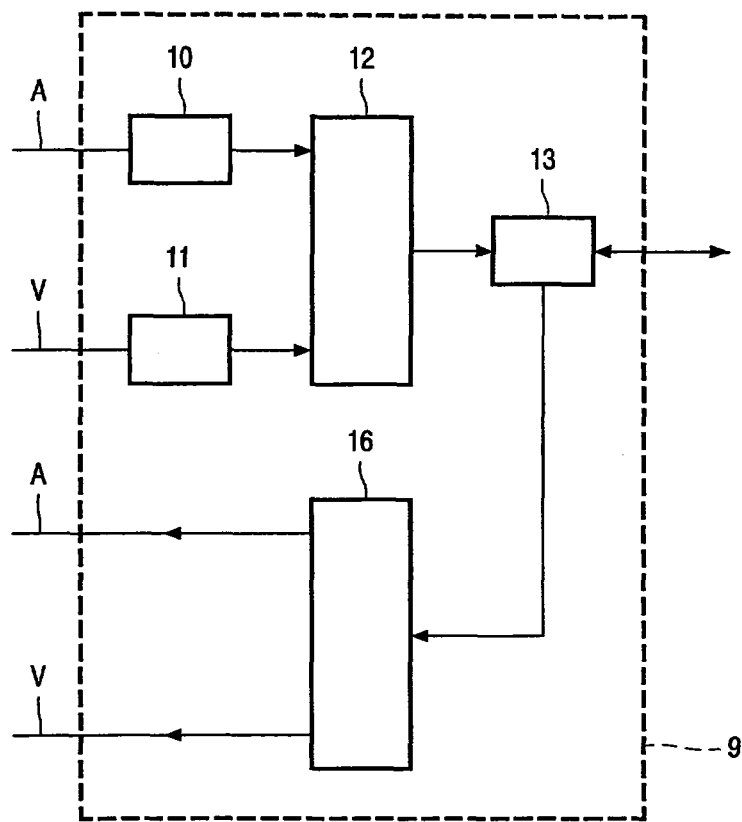
FIG. 9 shows a CODEC unit.

FIG. 8 illustrates the A/V input unit 1 in more detail. A tuner 5, which is connected to the antenna input terminal 2, demodulates the modulated A/V antenna signals and outputs the demodulated signals to a suitable A/V demultiplexing unit 6 for separating audio signals from video signals. An audio A/D converter unit 7 outputs a digital audio signal A and a NTSC/PAL/SECAM decoding unit 8, comprising a video A/D converter, outputs a digital video signal V. These signals A and V are outputted to a encoding/decoding unit 9, which is illustrated in more detail in FIG. 9. The encoding/decoding unit 9 compresses and encodes the signals A and V, respectively by an audio encoder 10 and a video encoder 11, converts them to a multiplexed and compressed stream conforming to Video Recording specifications, employing a multiplexer 12. To this purposes the audio encoder 10 and video encoder 11 are adapted to perform source compression according to a specific standard for compression, such as for example MPEG-2 for audio and video.

The compressed and multiplexed stream is submitted via a track buffer 13, which absorbs rate fluctuations stemming from intermittent recording and data reproduction from a disc, to a drive unit 14. The encoding/and decoding unit 9 also expands a compressed stream read from a recording medium by the drive unit 14 and outputs separately an audio signal A and a video signal V to the A/V output unit 15. To this purpose, the encoding/decoding unit 9 comprises a suitable A/V decoder 16 for decoding the compressed audio and video source signals.

Figure 10:
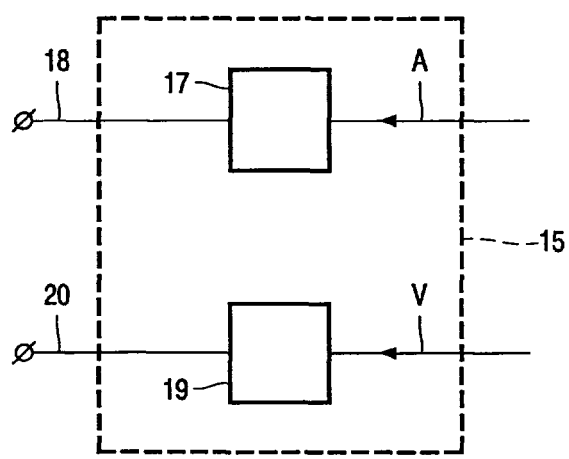
FIG. 10 shows an A/V output unit.

The A/V output unit 15, which is illustrated in more detail in FIG. 10, comprises an audio D/A converter 17 for outputting sound signals to an external sound output terminal 18. The A/V output unit 15 further comprises a video encoder— D/A converter unit 19 for outputting video signals to an external image output terminal 20.

Figure 11:
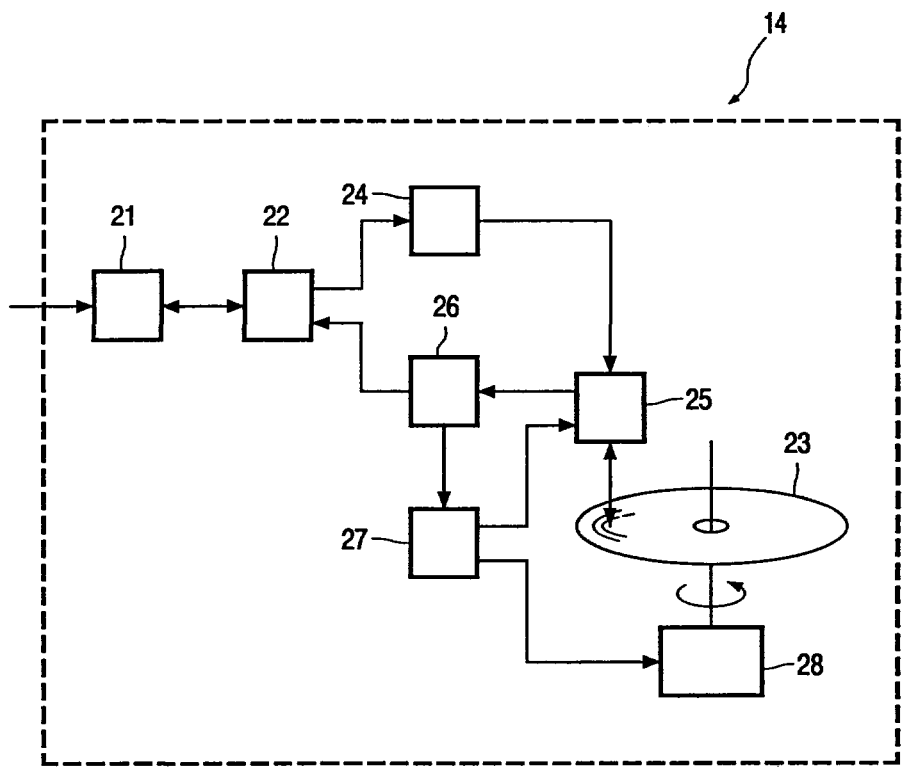
FIG. 11 shows a drive unit.

FIG. 11 illustrates the drive unit 14 in more detail. This unit 14 receives the compressed stream generated by the encoding/decoding unit 9, and adds an error-correction code by a suitable error correction processing unit 21 to the stream. Next a channel modulation/demodulation unit 22 converts the stream with error-correction code to channel bits adapted for recording on a recording medium 23. In case of a DVD-disc the EFM+ modulation scheme is being applied. Recording and reading in case of a recording medium 23 of the optical type, is performed by a laser comprised in an optical head unit 25. A laser power control unit 24 is controlling the laser. Reflected signals from the recording medium 23 are being converted by an amplifier and waveform equalizer circuit 26 into two-value signals. The resultant compressed stream is further demodulated by the modulating/demodulation unit 22, error corrected by the error correction processing unit 21 and outputted to the encoding/decoding unit 9 via track buffer 13.

A servo circuit 27, connected to the amplifier and waveform equalizer circuit 26, controls the positioning of the optical head unit 25 relative to the recording medium 23 and the rotational velocity of the recording medium 23 by controlling rotational driving means 28.

Figure 12:
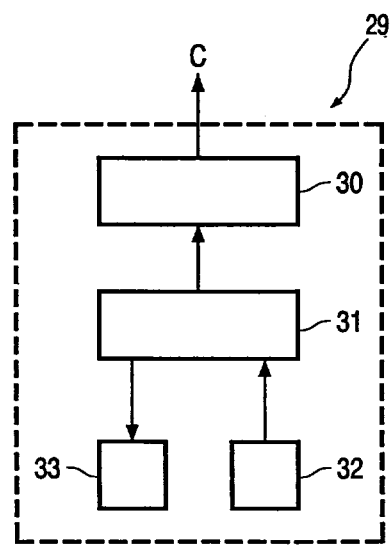
FIG. 12 shows a system control unit.

A system control unit 29, as shown in FIG. 12, controls each block and perform file control, control information management and track buffer control. To this purpose a system control processing unit 30 is provided that is being connected to memory means 31 loaded with a suitable operation system. Operator input means 32 and operator output means 33 are connected to the memory means 31. The operator input means 32 comprising for instance keying means and the operator output means comprising display means.

Although the invention has been described with reference to preferred embodiments thereof, it is to be understood that these are not limitative examples. Thus, various modifications thereof may become apparent to those skilled in the art, without departing from the scope of the invention, as defined by the claims. The invention can be implemented by means of both hardware and software, and that several "means" may be represented by the same item of hardware. Further, the invention lies in each and every novel feature or combination of features. It is also remarked that the word 'comprising' does not exclude the presence of other elements or steps than those listed in a claim. Any reference signs do not limit the scope of the claims.

LIST OF REFERRED DOCUMENTS (D1) European Patent Application EP 724 264
(D2) U.S. Pat. No. 5,784,528

(D3) ISO/IEC 13818-1: 1995 Information Technology—Generic Coding of moving pictures and associated audio information: Part 1: Systems (MPEG2-systems)

The invention claimed is:

1. A method of recording an encoded bit stream, said encoded bit stream representing a plurality of video objects comprising a sequence of cells together constituting a part of an MPEG2 Program Stream on a disc, said method comprising the acts:

recording a collection of contiguously arranged video objects in a video object storage area of said disc;

recording management information in a management information area of said disc for storing information about the recorded video objects, wherein said collection is partitioned into adjacent recordings that represent playable titles;

defining a playable title as a playback sequence of all complete cells or a subset of complete cells of a recording in an order of allocation within the video object storage area on the disc; and generating a title list of titles sorted in the order of allocation within the video object storage area on the disc, creating two titles for the recording, the two titles including a full title and a play list title, and in response to deleting two consecutive full titles, combining play lists related to the two consecutive full titles and tagging the combined play lists as free space.

2. The method according to claim 1, further comprising the act of defining a free space title that represent free space within the video object area and including the free space title in the title list.

3. The method according to claim 2, further comprising the act of blocking free space titles from playback.

4. The method according to claim 3, further comprising the act of converting a deleted title to a free space title.

5. The method according to claim 4, further comprising the act of generating a title menu listing the titles in a same order as in the title list for allowing user access to the titles.

6. A recording apparatus for recording an encoded bit stream representing a plurality of video objects comprising a sequence of cells together constituting a part of an MPEG2 Program Stream on a disc, the recording apparatus comprises:

a recorder configured to record a collection of contiguously arranged video objects in a video object storage area of said disc and to record management information in a management information area of said disc for storing information about the recorded video objects, wherein said collection is partitioned into adjacent recordings that represent playable titles; and a system controller configured to:

define a playable title as a playback sequence of all complete cells or a subset of complete cells of a recording in an order of allocation within the video object storage area on the disc;

generate a title list of titles sorted in the order of allocation within the video object storage area on the disc;

create two titles for the recording, the two titles including a full title and a play list title; and in response to deleting two consecutive full titles, combine play lists related to the two consecutive full titles and tagging the combined play lists as free space.

7. The recording apparatus according to claim 6, wherein the system controller is configured to define a free space title that represents free space within the video object area and include the free space title in the title list.

8. The recording apparatus according to claim 7, wherein the system controller is configured to block free space titles from playback.

9. The recording apparatus according to claim 8, wherein the system controller is configured to convert a deleted title to a free space title.

10. The recording apparatus according to claim 9, wherein the system controller is configured to generate a title menu listing the titles in a same order as in the title list for allowing user access to the titles, and wherein the recorder comprises a display for displaying the title menu.

11. The method of claim 1, further comprising the act of tagging as free space both the full title and the play list title when a full title is deleted.

12. The method of claim 1, wherein the plurality of video objects have a video object identification number which is equal to one, and the cells include cell Identification numbers that are unique and non-sequential.

13. The method of claim 1, wherein the plurality of video objects and the cells include navigation packs with forward references to facilitate forward search and wherein, during recording of the plurality of video objects, the forward references comprise predetermined values.

14. The method of claim 13, wherein the navigation packs further include a parameter specifying presentation termination time of a last video frame of a video object, wherein an initial value of the presentation termination time comprises a predetermined value, and further comprising a buffer cell at an end of the video object to guarantee that the end of the video object is never reached during play back.

15. The recording apparatus of claim 6, wherein the system controller is further configured to tag as free space both the full title and the play list title when a full title is deleted.

16. The recording apparatus of claim 6, wherein the plurality of video objects have a video object identification number which is equal to one, and the cells include cell Identification numbers that are unique and non-sequential.

17. The recording apparatus of claim 6, wherein the plurality of video objects and the cells include navigation packs with forward references to facilitate forward search and wherein, during recording of the plurality of video objects, the forward references comprise predetermined values.

18. The recording apparatus of claim 17, wherein the navigation packs further include a parameter specifying presentation termination time of a last video frame of a video object, wherein an initial value of the presentation termination time comprises a predetermined value, and further comprising a buffer cell at an end of the video object to guarantee that the end of the video object is never reached during play back.

* * * * *